(12) United States Patent
Dhanapal

(10) Patent No.: US 11,884,400 B2
(45) Date of Patent: Jan. 30, 2024

(54) SYSTEM AND METHOD FOR CONTROLLING LID OF TRASH RECEPTACLE OF AIRCRAFT LAVATORY

(71) Applicant: B/E AEROSPACE, INC, Winston Salem, NC (US)

(72) Inventor: Manikandan Dhanapal, Thanjavur (IN)

(73) Assignee: B/E AEROSPACE, INC., Winston Salem, NC (US)

( * ) Notice: Subject to any disclaimer, the term of this patent is extended or adjusted under 35 U.S.C. 154(b) by 601 days.

(21) Appl. No.: 16/985,504

(22) Filed: Aug. 5, 2020

(65) Prior Publication Data

US 2021/0331800 A1    Oct. 28, 2021

(30) Foreign Application Priority Data

Apr. 25, 2020   (IN) .............................. 202041017759

(51) Int. Cl.
   *B64D 11/02*     (2006.01)
   *B65F 1/16*      (2006.01)

(52) U.S. Cl.
   CPC ............ *B64D 11/02* (2013.01); *B65F 1/1638* (2013.01)

(58) Field of Classification Search
   CPC ............................... B64D 11/02; B65F 1/1638
   USPC ......................................................... 220/211
   See application file for complete search history.

(56) References Cited

U.S. PATENT DOCUMENTS

| | | |
|---|---|---|
| 4,996,467 A | 2/1991 | Day |
| 6,774,586 B1 | 8/2004 | Shih |
| 7,741,801 B2 | 6/2010 | Fukuizumi |
| 8,080,952 B2 | 12/2011 | Lotfi et al. |
| 10,022,467 B2 | 7/2018 | Chang |
| 2004/0174268 A1 | 9/2004 | Scott et al. |
| 2005/0258794 A1* | 11/2005 | Fukuizumi ............ B65F 1/1638 |
| | | 318/480 |
| 2007/0266637 A1* | 11/2007 | McGowan ................ B65F 1/06 |
| | | 220/908 |
| 2014/0117114 A1 | 5/2014 | Muderlak et al. |
| 2017/0283092 A1 | 10/2017 | Brown et al. |
| 2017/0313509 A1 | 11/2017 | Mshamma |

(Continued)

FOREIGN PATENT DOCUMENTS

| CA | 3058749 A1 * | 5/2020 | ............... A61L 2/10 |
|---|---|---|---|
| EP | 1600373 | 11/2005 | |

(Continued)

OTHER PUBLICATIONS

European Patent Office, European Search Report dated Sep. 3, 2021 in Application No. 21170528.0.

*Primary Examiner* — J. Gregory Pickett
*Assistant Examiner* — Niki M Eloshway
(74) *Attorney, Agent, or Firm* — SNELL & WILMER L.L.P.

(57) ABSTRACT

Systems, methods, and articles of manufacture for controlling a lid of a trash receptacle of an aircraft lavatory. Generally, the systems, methods, and articles of manufacture disclosed and described herein facilitate controlled opening and closing actuations of a lid of a trash receptacle of an aircraft lavatory. By controlling the opening and/or closing actuations of the lid, hygiene and sanitation of the lavatory are improved, odors are prevented from dispersing throughout the lavatory and/or cabin of the aircraft, and fire hazards are reduced.

17 Claims, 4 Drawing Sheets

(56) References Cited

U.S. PATENT DOCUMENTS

2019/0292765 A1* 9/2019 Goeschel ................ E03F 1/006
2021/0380336 A1* 12/2021 McIntosh .............. B65F 1/1405
2022/0315328 A1* 10/2022 Wang .................... B65F 1/1638

FOREIGN PATENT DOCUMENTS

| EP | 3932808 A1 * | 1/2022 | ............ B64D 11/02 |
| EP | 4053270 A1 * | 9/2022 | |
| EP | 4053271 A1 * | 9/2022 | |
| WO | 2017098572 | 6/2017 | |

* cited by examiner

SYSTEM AND METHOD FOR CONTROLLING LID OF TRASH RECEPTACLE OF AIRCRAFT LAVATORY

CROSS-REFERENCE TO RELATED APPLICATIONS

This application claims priority to and the benefit of India Patent Application No. 202041017759 filed Apr. 24, 2020 entitled "SYSTEM AND METHOD FOR CONTROLLING LID OF TRASH RECEPTACLE OF AIRCRAFT LAVATORY," which is incorporated herein by reference in its entirety for all purposes.

FIELD

The present disclosure relates to systems and methods for controlling a lid of a trash receptacle, and in particular for controlling lids of trash receptacles in aircraft lavatories.

BACKGROUND

Aircraft generally include one or more lavatories for passengers to use during flight.

Aircraft lavatories generally include a toilet, a washbasin, and a trash receptacle, among other features. Conventional aircraft trash receptacles include a lid that is manually opened by a passenger to uncover the access opening for the trash receptacle, thereby allowing the passenger to deposit refuse, garbage, rubbish, or other waste products. However, because passengers must directly touch conventional lids to open/close to gain access to the trash receptacle, such lids are often non-hygienic and may become not sanitary. Further, some lids remain open even after the passenger has left the lavatory, thereby allowing odors from the trash receptacle to fill the lavatory. Additionally, lids for trash receptacles that remain open for extended periods of time may be a fire hazard.

SUMMARY

In various embodiments, the present disclosure provides a system for controlling a lid of a trash receptacle for use in an aircraft lavatory. The system may include a housing defining a volume for the trash receptacle, the housing defining an access opening to the trash receptacle through which trash can be inserted. The system may also include the lid pivotably coupled to the housing adjacent the access opening to the trash receptacle. The lid may be configured to be pivotable between at least an open position and a closed position relative to the access opening. The system may also include an actuator coupled to the lid and a controller electrically coupled to the actuator, wherein the controller is configured to command the actuator to perform at least one of an opening actuation to pivot the lid to the open position and a closing actuation to pivot the lid to the closed position.

In various embodiments, the controller is configured to command the actuator to perform the closing actuation in response to a passenger exiting the aircraft lavatory. In various embodiments, the controller is configured to command the actuator to maintain the lid in the closed position in response to the aircraft lavatory being vacant. The system may further include a lavatory occupancy sensor electrically coupled to the controller, wherein the controller is configured to command the actuator to maintain the lid in the closed position in response to the lavatory occupancy sensor reporting vacancy of the aircraft lavatory.

The controller may be configured to command the actuator to perform the closing actuation in response to a door of the aircraft lavatory changing from locked to unlocked. In various embodiments, the controller is configured to command the actuator to maintain the lid in the closed position in response to a door to the aircraft lavatory being unlocked. The system may further include a door sensor of a door of the aircraft lavatory, wherein the door sensor is electrically coupled to the controller and the controller is configured to command the actuator to maintain the lid in the closed position in response to the door sensor reporting the door being unlocked.

In various embodiments, the controller is configured to command the actuator to perform the opening actuation in response to a passenger pressing a button electrically coupled to the controller. The system may further include a proximity sensor electrically coupled to the controller, wherein the controller is configured to command the actuator to perform the opening actuation in response to the proximity sensor reporting an object is proximate the lid. The proximity sensor may be an infrared sensor or a photoresistor sensor.

Also disclosed herein, according to various embodiments, is an article of manufacture comprising a processor and a tangible, non-transitory computer-readable storage medium having instructions stored thereon that, in response to execution by the processor, cause the processor to perform various operations. The various operations may include opening, by the processor, a lid of a trash receptacle of an aircraft lavatory and closing, by the processor, the lid of the trash receptacle of the aircraft lavatory.

In various embodiments, the operations further comprise receiving, by the processor, an occupancy status of the aircraft lavatory, wherein the closing is performed in response to the occupancy status changing from occupied to vacant. In various embodiments, the operations further comprise maintaining, by the processor, the lid of the trash receptacle in a closed position in response to the occupancy status being vacant. In various embodiments, the operations further include receiving, by the processor, a door status of a door of the aircraft lavatory, wherein the closing is performed in response to the door status changing from locked to unlocked. In various embodiments, the operations further comprise maintaining, by the processor, the lid of the trash receptacle in a closed position in response to the door status being unlocked.

Also disclosed herein, according to various embodiments, is a method of controlling a lid of a trash receptacle for use in an aircraft lavatory. The method may include opening, by a controller, a lid of a trash receptacle of an aircraft lavatory. The method may also include closing, by the controller, the lid of the trash receptacle of the aircraft lavatory.

In various embodiments, the method further includes receiving, by the controller, an occupancy status of the aircraft lavatory, wherein the closing is performed in response to the occupancy status changing from occupied to vacant. In various embodiments, the method further includes maintaining, by the controller, the lid of the trash receptacle in a closed position in response to the occupancy status being vacant. In various embodiments, the method includes receiving, by the controller, a door status of a door of the aircraft lavatory, wherein the closing is performed in response to the door status changing from locked to unlocked. The method may also include maintaining, by the controller, the lid of the trash receptacle in a closed position in response to the door status being unlocked.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
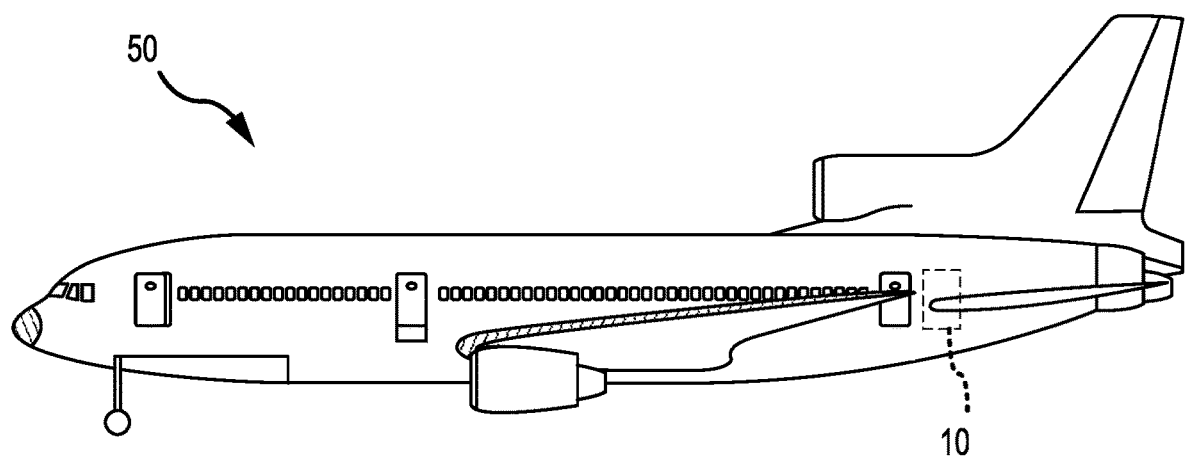
FIG. 1 illustrates an aircraft having a lavatory, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Disclosed herein, according to various embodiments, are systems, methods, and articles of manufacture for controlling a lid of a trash receptacle of an aircraft lavatory. Generally, the systems, methods, and articles of manufacture disclosed and described herein facilitate controlled opening and closing actuations of a lid of a trash receptacle of an aircraft lavatory. By controlling the opening and/or closing actuations of the lid, hygiene and sanitation of the lavatory are improved, odors are prevented from dispersing throughout the lavatory and/or cabin of the aircraft, and fire hazards are reduced, among other benefits and according to various embodiments. Although numerous details and examples are included herein pertaining to aircraft lavatories, the present disclosure is not necessarily so limited, and thus aspects of the disclosed embodiments may be adapted for performance in a variety of other industries (e.g., trains, vehicles, etc.). As such, numerous applications of the present disclosure may be realized.

Figure 2:
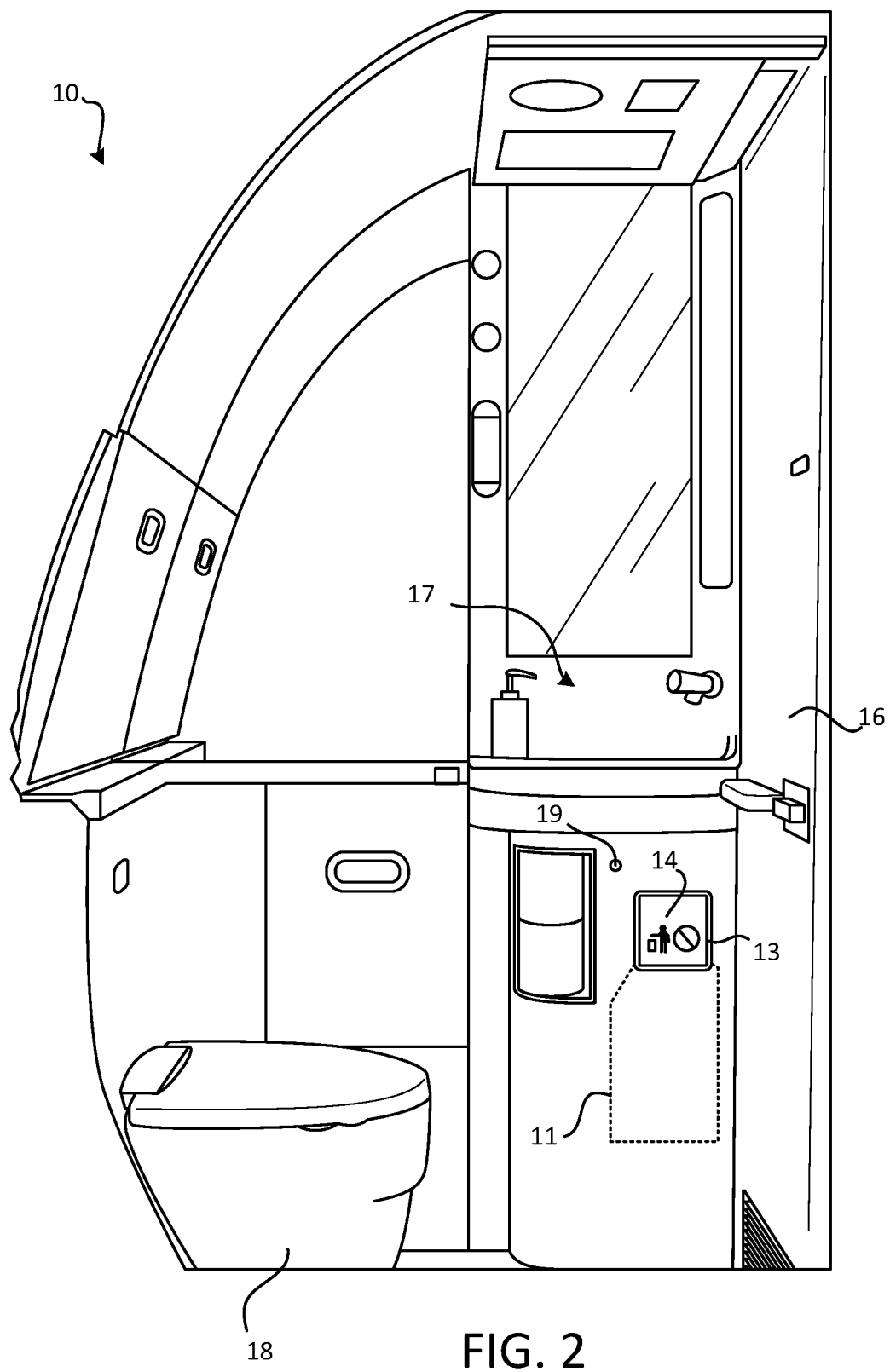
FIG. 2 illustrates a perspective view of an aircraft lavatory, in accordance with various embodiments.

In various embodiments, and with reference to FIGS. 1 and 2, an aircraft 50 may include aircraft lavatory 10. The aircraft lavatory 10 may include a trash receptacle 11, a lid 14 for the trash receptacle 11, a door 16, a washbasin 17, and a toilet 18, among other features. The trash receptacle 11 may be defined by, or may be disposed in, a volume defined by a housing, paneling, or a wall section of the aircraft lavatory 10. The housing may also define an access opening 13 to the trash receptacle 11, and the lid 14 may be pivotably, hingedly, or otherwise moveably coupled to the housing adjacent the access opening 13, and thereby the lid 14 may selectively cover the access opening 13. For example, the lid 14 may be pivot away from the access opening 13 to allow access to the trash receptacle 11 and may pivot toward and engage the rim of the access opening 13 to close the lid 14 and seal off access to the trash receptacle 11.

Figure 3A:
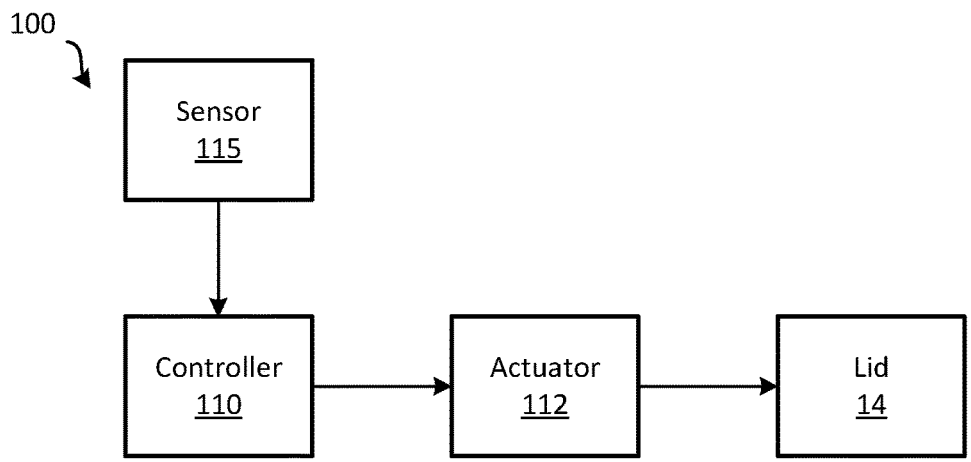
FIG. 3A is a schematic block diagram of a system for controlling a lid of a trash receptacle of an aircraft lavatory, in accordance with various embodiments.

In various embodiments, and with reference to FIGS. 2 and 3A, a system 100 for controlling the lid 14 of the trash receptacle 11 for use in the aircraft lavatory 10 is provided. The system 100 may include the housing that defines the volume/space for the trash receptacle 11 and the access opening 13. In various embodiments, the system 100 also includes the lid 14 pivotably coupled to the housing adjacent the access opening 13. In various embodiments, the system 100 further includes an actuator 112 coupled to the lid 14, and a controller 110 electrically coupled to the actuator 112. Generally, the controller 110 may be configured to command the actuator 112 to perform an opening actuation to pivot the lid 14 to an open position (from a closed position) and/or to perform a closing actuation to pivot the lid to the closed position (from the open position).

The lid 14 may pivot about a top edge, a bottom edge, or a lateral side edge of the access opening. Additionally, the lid 14 may pivot inward or outward relative to the access opening 13. The actuator 112 may include one or more levers or straps connected to the lid 14, and the actuator 112 may include one or more rotational or linear mechanisms powered, for example, by a direct current power supply from the aircraft 50. Accordingly, the "actuator" 112 generally refers to devices, structures, and mechanisms that effectuate movement of the lid 14 in response to commands from the controller 110.

In various embodiments, the system 100 may include one or more sensors 115 to trigger the opening of the lid 14. That is, sensor 115 may be configured to receive or detect a condition, and this received/detected condition may be passed to the controller 110 to initiate the opening actuation via the actuator 112. In various embodiments, the sensor 115 may include a mechanism with which a passenger occupying the aircraft lavatory 10 may interact. For example, the sensor 115 may be a button 19 (FIG. 2) in the aircraft lavatory 10 that a passenger may press to cause the lid 14 to open. That is, the button 19 may be in electric communication with the controller 110, and upon receipt by the controller of a signal indicating a button-push, the controller 110 may control the actuator 112 to perform the opening actuation to open the lid 14. The controller 110 may be configured to keep the lid 14 open for a predetermined period of time after the button-push, or the controller 110 may be configured to close the lid 14 in response to a subsequent button-push. Thus, pressing the button 19 may toggle the opening/closing of the lid 14.

In various embodiments, the sensor 115 is a proximity sensor. The proximity sensor may be mounted adjacent the lid 14 and may be electrically coupled to the controller. The proximity sensor may detect and report when/if an object, such as a hand of a passenger, is proximate the lid 14, and this detected condition may be passed to the controller 110 to thereby command the actuator 112 to perform the opening actuation to open the lid 14. The proximity sensor may be an infrared sensor (e.g., a passive infrared sensor), a photoresistor sensor (e.g., a light decreasing resistor), an ultrasonic sensor, and/or a gesture sensor. The closing actuation may be performed in response to the proximity sensor no longer detecting an object proximate the lid 14. In various embodiments, the controller 110 may be configured to have a predetermined delay period, thus allowing the lid 14 to may remain open for a period of time after the object is removed from being proximate the lid 14.

Figure 3B:
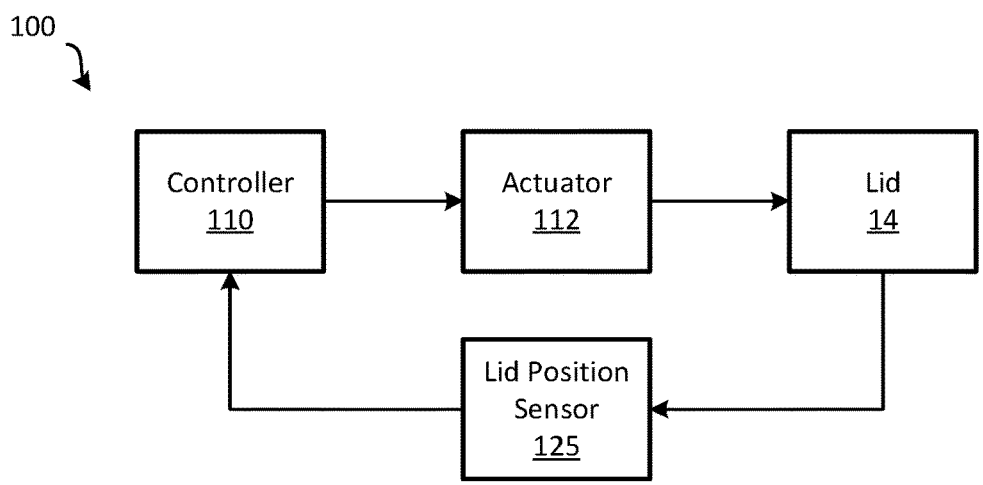
FIG. 3B is a schematic block diagram of a system for controlling a lid of a trash receptacle of an aircraft lavatory, in accordance with various embodiments.

In various embodiments, and with reference to FIG. 3B, the system 100 may further include a lid position sensor 125. The lid position sensor 125 may be electronically coupled in feedback providing communication with the controller 110 pertaining to the position of the lid 14. That is, the lid position sensor 125 may be operably coupled to the lid 14 and may be configured to detect a position of the lid 14 relative to the access opening 13, and thereby may report back to the controller 110 the position/status of the lid 14. In various embodiments, the lid position sensor 125 facilitates failure detection and corresponding correction.

Figure 3C:
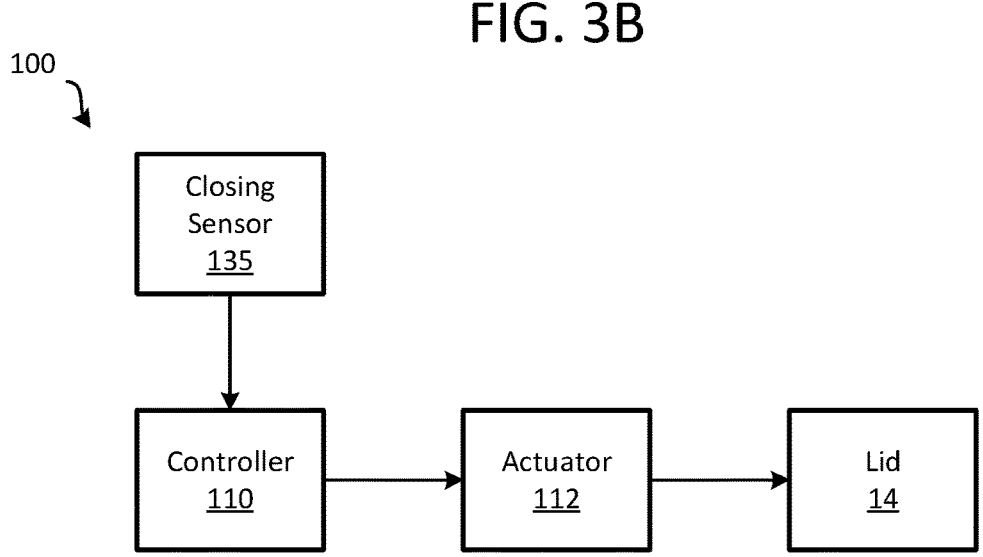
FIG. 3C is a schematic block diagram of a system for controlling a lid of a trash receptacle of an aircraft lavatory, in accordance with various embodiments.

In various embodiments, and with reference to FIG. 3C, the system 100 may further include one or more closing sensors 135. As used herein, the term "closing sensor(s)" refers to sensors that facilitate closure of the lid 14 without intentional action from the passenger. That is, as opposed to the button and/or proximity sensors described above with reference to FIG. 3A (sensor 115) which are triggered by deliberate and intentional action by the passenger/occupant to engage with the sensors 115, the closing sensors 135 are configured to detect conditions in/of the aircraft lavatory 10 that result in the lid 14 being automatically closed (via the controller 110 and the actuator 112) without deliberate/intentional action from the passenger.

In various embodiments, the closing sensors 135 include one or more occupancy sensors and/or one or more door sensors. That is, the closing sensor 135 may be an occupancy sensor configured to detect whether a passenger is in the aircraft lavatory and/or whether a passenger is leaving the aircraft lavatory. The closing sensor 135 may be a door sensor configured to detect a position/state of the door 16 (FIG. 2) of the aircraft lavatory 10 (e.g., whether the door is locked or unlocked). The closing sensor 135 may be electrically coupled to the controller 110 to provide the functionality described immediately below.

In various embodiments, closing sensor 135 may detect a passenger exiting the aircraft lavatory, and the controller 110 may be configured to command the actuator 112 to perform the closing actuation in response. In various embodiments, the controller 110 is configured to command the actuator 112 to maintain the lid 14 in the closed position in response to the aircraft lavatory being vacant (as detected by the closing sensor 135, which may an occupancy/door sensor). For example, the controller 110 may be configured to command the actuator 112 to maintain the lid 14 in the closed position in response to a lavatory occupancy sensor reporting vacancy of the aircraft lavatory.

In various embodiments, closing sensor 135 detects a condition of the door 16 to the aircraft lavatory 10. That is, the closing sensor 135 may detect the condition of the door 16 changing from locked to unlocked, and the controller 110 may thus command the actuator 112 to perform the closing actuation in response. In various embodiments, the controller 110 is configured to command the actuator 112 to maintain the lid 14 in the closed position in response to the door 16 to the aircraft lavatory 10 being unlocked. For example, the controller 110 may be configured to command the actuator 112 to maintain the lid 14 in the closed position in response to a door sensor reporting the door being unlocked.

In various embodiments, the features of FIGS. 3A, 3B, and 3C may be combinable with each other in various manners. That is, the system 100 may include one or more of the sensors 115 described above with reference to FIG. 3A (pertaining to opening/closing the lid via intentional action by the passenger). Additionally, the system 100 may include the lid position sensor of FIG. 3B, and/or the system 100 may include one or more of the closing sensors 135 described above with reference to FIG. 3C.

In various embodiments, the controller 110 may be integrated into computer systems onboard the aircraft, or the controller may be a standalone controller. In various embodiments, the controller 110 comprises a processor. In various embodiments, the controller 110 is implemented in a single processor. In various embodiments, the controller 110 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. The controller 110 may comprise a processor configured to implement various logical operations in response to execution of instructions, for example, instructions stored on a non-transitory, tangible, computer-readable medium configured to communicate with the controller 110.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Figure 4:
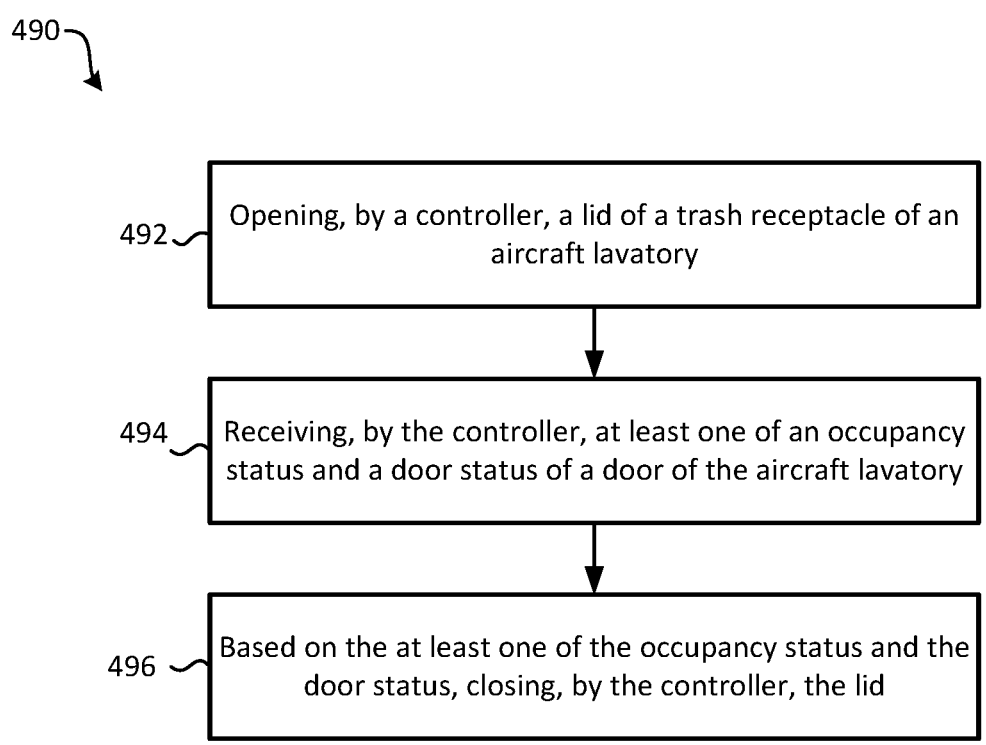
FIG. 4 is a schematic flow chart diagram of a method of controlling a lid of a trash receptacle of an aircraft lavatory, in accordance with various embodiments.

In various embodiments, the controller 110 may be, or may be incorporated into, an article of manufacture. Thus, the terms "controller" and "article of manufacture" may be used interchangeably herein. The article of manufacture may include a processor and a storage medium/memory, as described above. The processor of the article of manufacture may execute instructions to perform various operations. The various operations performed by the processor are as shown in FIG. 4, according to various embodiments. That is, FIG. 4 shows a schematic flow chart diagram of a method 490 of controlling a lid of a trash receptacle of an aircraft lavatory. The method 490, and thus the operations performed by the processor, may include, opening, by the processor, the lid 14 of the trash receptacle 11 of the aircraft lavatory 10 at step 492. The method 490 may further include closing, by the processor, the lid 14 of the trash receptacle 11 of the aircraft lavatory 10 at step 496. In various embodiments, the method 490 also includes receiving, by the controller, at least one of an occupancy status of the aircraft lavatory and a door status of a door of the aircraft lavatory at step 494. In various embodiments, step 496 is based on step 494, in that the occupancy status and/or the door status determines whether the lid 14 is closed.

In various embodiments, closing the lid 14 is performed in response to the occupancy status changing from occupied to vacant. That is, in response to the controller 110 receiving an input indicating that the occupancy status of the aircraft lavatory 10 has changed from occupied to vacant, the processor of the controller 110 may send commands to the actuator to close the lid 14 of the trash receptacle 11. In various embodiments, the operations further include maintaining, by the processor of the controller 110, the lid 14 of the trash receptacle 11 in the closed position in response to the occupancy status being, and/or remaining, vacant.

In various embodiments, closing the lid 14 is performed in response to a door status of a door of the aircraft lavatory 10 changing from locked to unlocked. That is, in response to the controller 110 receiving an input indicating that the door status has changed from locked to unlocked, the processor of the controller 110 may send commands to the actuator 112 to close the lid 14. In various embodiments, the operations further include maintaining, by the processor, the lid of the trash receptacle in a closed position in response to the door status being unlocked.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for controlling a lid of a trash receptacle for use in an aircraft lavatory, the system comprising:
   a housing defining a volume for the trash receptacle, the housing defining an access opening to the trash receptacle through which trash can be inserted;
   the lid pivotably coupled to the housing adjacent the access opening to the trash receptacle, wherein the lid is configured to be pivotable between at least an open position and a closed position relative to the access opening;
   an actuator coupled to the lid;
   a controller electrically coupled to the actuator, wherein the controller is configured to command the actuator to perform at least one of an opening actuation to pivot the lid to the open position and a closing actuation to pivot the lid to the closed position;
   a proximity sensor coupled to the lid and electrically coupled to the controller, wherein the proximity sensor is configured to detect whether an object is proximate the lid, and the controller is configured to have a predetermined delay period such that the controller is configured to command the actuator to maintain the lid in the open position for a period of time after the object is removed from being proximate the lid; and
   a lavatory occupancy sensor electrically coupled to the controller, wherein the controller is configured to command the actuator to maintain the lid in the closed position in response to the lavatory occupancy sensor reporting vacancy of the aircraft lavatory.

2. The system of claim 1, wherein the controller is configured to command the actuator to perform the closing actuation in response to a passenger exiting the aircraft lavatory.

3. The system of claim 1, wherein the controller is configured to command the actuator to maintain the lid in the closed position in response to the aircraft lavatory being vacant.

4. The system of claim 1, wherein the controller is configured to command the actuator to perform the closing actuation in response to a door of the aircraft lavatory changing from locked to unlocked.

5. The system of claim 1, wherein the controller is configured to command the actuator to maintain the lid in the closed position in response to a door to the aircraft lavatory being unlocked.

6. The system of claim 1, further comprising a door sensor of a door of the aircraft lavatory, wherein the door sensor is electrically coupled to the controller and the controller is configured to command the actuator to maintain the lid in the closed position in response to the door sensor reporting the door being unlocked.

7. The system of claim 1, wherein the controller is configured to command the actuator to perform the opening actuation in response to a passenger pressing a button electrically coupled to the controller.

8. The system of claim 1, wherein the controller is configured to command the actuator to perform the opening actuation in response to the proximity sensor reporting the object is proximate the lid.

9. The system of claim 8, wherein the proximity sensor is at least one of an infrared sensor and a photoresistor sensor.

10. An article of manufacture comprising a processor and a tangible, non-transitory computer-readable storage medium having instructions stored thereon that, in response to execution by the processor, cause the processor to perform operations comprising:
receiving, by the processor, a detection that an object is proximate a lid of the trash receptacle of the aircraft lavatory via a proximity sensor;
maintaining, by the processor, the lid in an open position for a predetermined delay period after the object is removed from being proximate the lid;
responsive to the predetermined delay period expiring, closing, by the processor and via an actuator, the lid of the trash receptacle of the aircraft lavatory;
determining, by the processor, whether the aircraft lavatory is vacant via a lavatory occupancy sensor; and
maintaining, by the processor, the lid in the closed position in response to the lavatory occupancy sensor reporting vacancy of the aircraft lavatory.

11. The article of manufacture of claim 10, wherein the operations further comprise receiving, by the processor, an occupancy status of the aircraft lavatory, wherein the closing is performed in response to the occupancy status changing from occupied to vacant.

12. The article of manufacture of claim 10, wherein the operations further comprise receiving, by the processor, a door status of a door of the aircraft lavatory, wherein the closing is performed in response to the door status changing from locked to unlocked.

13. The article of manufacture of claim 12, wherein the operations further comprise maintaining, by the processor, the lid of the trash receptacle in a closed position in response to the door status being unlocked.

14. A method of controlling a lid of a trash receptacle for use in an aircraft lavatory, the method comprising:
receiving, by the controller, a detection that an object is proximate the lid via a proximity sensor;
maintaining, by the controller, the lid in an open position for a predetermined delay period after the object is removed from being proximate the lid;
responsive to the predetermined delay period expiring, closing, by the controller and via an actuator, the lid of the trash receptacle of the aircraft lavatory;
determining, by the controller, whether the aircraft lavatory is vacant via a lavatory occupancy sensor; and
maintaining, by the controller, the lid in the closed position in response to the lavatory occupancy sensor reporting vacancy of the aircraft lavatory.

15. The method of claim 14, further comprising receiving, by the controller, an occupancy status of the aircraft lavatory, wherein the closing is performed in response to the occupancy status changing from occupied to vacant.

16. The method of claim 14, further comprising receiving, by the controller, a door status of a door of the aircraft lavatory, wherein the closing is performed in response to the door status changing from locked to unlocked.

17. The method of claim 16, further comprising maintaining, by the controller, the lid of the trash receptacle in a closed position in response to the door status being unlocked.

* * * * *